United States Patent
Pauplis (10) Patent No.: US 11,422,226 B2
(45) Date of Patent: Aug. 23, 2022

(54) SYSTEMS AND METHODS FOR MULTIPATH BEAM NULLING

(71) Applicant: Raytheon Company, Waltham, MA (US)

(72) Inventor: Barbara Pauplis, Carlisle, MA (US)

(73) Assignee: RAYTHEON COMPANY, Waltham, MA (US)

(*) Notice: Subject to any disclaimer, the term of this patent is extended or adjusted under 35 U.S.C. 154(b) by 208 days.

(21) Appl. No.: 16/708,478

(22) Filed: Dec. 10, 2019

(65) Prior Publication Data

US 2021/0173040 A1 Jun. 10, 2021

(51) Int. Cl.
*G01S 7/02* (2006.01)

(52) U.S. Cl.
CPC .................................. *G01S 7/023* (2013.01)

(58) Field of Classification Search
CPC ....................................................... G01S 7/023
See application file for complete search history.

(56) References Cited

U.S. PATENT DOCUMENTS

| | | | | |
|---|---|---|---|---|
| 5,343,211 A * | 8/1994 | Kott | ...................... | G01S 7/2813 342/381 |
| 8,817,927 B2 * | 8/2014 | Zai | ........................ | G01S 7/0232 375/349 |
| 8,947,294 B1 * | 2/2015 | Wasiewicz | ............ | G01S 7/2813 342/162 |
| 10,243,761 B1 * | 3/2019 | Stockmaster | ..... | H04L 25/03006 |
| 10,334,454 B2 * | 6/2019 | Orhan | ................... | H04B 7/0695 |
| 2004/0196172 A1 * | 10/2004 | Wasiewicz | ............ | G01S 13/913 342/33 |
| 2007/0285315 A1 * | 12/2007 | Davis | ..................... | H01Q 21/22 342/377 |
| 2017/0031013 A1 | 2/2017 | Halbert et al. | | |
| 2017/0082739 A1 * | 3/2017 | Horner | .................... | G01S 7/526 |
| 2018/0003816 A1 * | 1/2018 | Olson | ................... | G01S 13/003 |
| 2018/0031690 A1 | 2/2018 | Schuman et al. | | |
| 2018/0156891 A1 | 6/2018 | Brune et al. | | |
| 2019/0131721 A1 * | 5/2019 | Dani | ..................... | H01Q 21/005 |
| 2021/0028542 A1 * | 1/2021 | Morin | .................... | H01Q 25/00 |
| 2021/0302594 A1 * | 9/2021 | Ryba | ........................ | G01S 19/21 |
| 2021/0305009 A1 * | 9/2021 | Raveh | ................... | H01J 37/153 |

OTHER PUBLICATIONS

International Search Report for PCT Appl. No. PCT/US20/54923 dated Jun. 29, 2021.

* cited by examiner

*Primary Examiner* — Marcus E Windrich
(74) *Attorney, Agent, or Firm* — Pearl Cohen Zedek Latzer Baratz LLP (57) ABSTRACT

A radar system and method are provided for reducing multipath interference signals. The multipath interference signals can be reduced by the radar system emitting electromagnetic waves that creates a null in the direction of expected multipath interference signals, such that the multipath interference signals are void (or substantially void) from signals received by the radar system.

17 Claims, 5 Drawing Sheets

SYSTEMS AND METHODS FOR MULTIPATH BEAM NULLING

GOVERNMENT RIGHTS IN THE INVENTION

This invention was made with government support under N00024-14-C-5315 awarded by the Naval Sea Systems Command. The government has certain rights in the invention.

FIELD OF THE INVENTION

The invention relates generally to radar systems. In particular, to reducing multipath interference in radar system.

BACKGROUNDS

Radar systems (e.g., radars) can be used to detect objects. For example, radar systems can be used on airplanes, ships, and/or ground vehicles to detect objects. For each different radar application (e.g., ground, air, sea, military, commercial, etc.) the radar system can have different requirements and constraints. Typical radar requirements can include an ability to detect objects within a particular field of view, range, and/or elevation with a particular accuracy and/or sensitivity.

Radar systems typically include an emitter and receiver. The emitter can allow electromagnetic waves (e.g., beam) to be transmitted from the radar system, sometimes, in a particular direction. The electromagnetic waves can impinge upon objects which can cause at least a portion of the electromagnetic waves to be reflected back towards the radar system and received by the receiver.

One difficulty with radar systems includes multipath interference. Multipath interference can occur when the emitted electromagnetic signals reflect off of objects while travelling to and/or from an object of interest (e.g., desired detection target). For example, ground, mountains, buildings and/or water bodies. The electromagnetic signals can be reflected back towards the radar system from the interference objects and can cause false object detection (e.g., ghost detections) with incorrect angle of arrivals and can also interfere with the detected angle of arrival of the desired target signal. Multipath returns can also increase the apparent length of targets making target (e.g., combat) identification incorrect. For example, a cruise-missile can be misclassified as an aircraft, which can change an expected lethality of the object. Improper lethality of the object can cause a combat system instructed by the radar system to improperly shoot/not-shoot down the target.

False targets can take radar resources away from the desired mission and/or can increase a number of tracks being maintained by the radar system, which can lead to delays in the radar processing time. Multipath can also increase or decrease signal-to-noise ratio which can contribute to the likelihood of tracks being dropped. Erroneously dropping tracks can typically cause the radar to detect the object again, which can result in the number of track changes to be artificially high, which can further impact radar resources because, for example, by reacquiring/initiating new tracks.

Therefore, it can be desirable to reduce multipath interference signals in radar systems.

SUMMARY OF THE INVENTION

Advantages of the invention can include elimination and/or substantial elimination of multipath interference. Other advantages of the invention can include improvement to track accuracy, track continuity, combat identification and/or improved radar resource allocation.

In one aspect, the invention involves a method for reducing multipath interference. The method can involve determining, by a radar system, a first set of digital beamforming weights based on a desired direction of one or more analog beams of the radar system, a desired direction of one or more digital beams, and an expected direction of the multipath interference signal. The method can also involve determining, by the radar system, a second set of digital beamforming weights based on the first set of digital beamforming weights to create a null in each of the one or more digital beams in the direction of the multipath interference signal. The method can also involve applying, by the radar system, the second set of digital beamforming weights during a receive duration of the radar system such that signals received by the radar system are void of the multipath interference signal.

In some embodiments, determining the first set of digital beamforming weights further comprises determining, by the radar system, an elevation angle of the multipath interference signals. In some embodiments, determining the first set of digital beamforming weights further comprises determine a location of the multipath interference signals.

In some embodiments, the method involves determining, by the radar system, a location of a target based on the plurality of reflection signals, determining, by the radar system, a distance between the location of the multipath interference signal and the location of the target, and setting the location of the multipath interference signals to a minimum distance value when the distance is less than the minimum distance.

In some embodiments, determining the second set of digital beamforming weights further involves determining, by the radar system, a first voltage of each digital beam of the radar system in the direction of the multipath interference signals, and determining, by the radar system, a second voltage of a nulling digital beam of the radar system in a direction that creates the nulls.

In some embodiments, the first voltage, the second voltage, or both are complex numbers. In some embodiments, the radar system is a digital beam forming radar. In some embodiments, the method further involves outputting, by the radar system, the signals received by the radar system to a display.

In another aspect, the invention includes a radar system for reducing multipath interference. The radar system can include one or more antenna arrays, each antenna array includes a plurality of antennas that can transmit and receive electromagnetic signals. The radar system can include a processor coupled to the one or more antenna arrays. The processor can be configured to control the one or more antenna arrays to determine a first set of digital beamforming weights based on a desired direction of one or more analog beams of the radar system, a desired direction of one or more digital beams, and an expected direction of the multipath interference signal, determine a second set of digital beamforming weights based on the first set of digital beamforming weights to create a null in each of the one or more digital beams in the direction of the multipath interference signal, and apply the second set of digital beamforming weights during a receive duration of the radar system such that signals received by the radar system are void of the multipath interference signal.

The radar system can include determining the first set of digital beamforming weights further comprises determining, by the radar system, an elevation angle of the multipath interference signals. The radar system can include determining the first set of digital beamforming weights further comprises determine a location of the multipath interference signals. The processor can be further configured to cause the radar system to determine a location of a target based on the plurality of reflection signals, determine a distance between the location of the multipath interference signal and the location of the target, and set the location of the multipath interference signals to a minimum distance value when the distance is less than the minimum distance.

In some embodiments, the processor can be further configured to determine a first voltage of each digital beam of the radar system in the direction of the multipath interference signals, and determine a second voltage of a nulling digital beam of the radar system in a direction that creates the nulls.

In some embodiments, the first voltage, the second voltage, or both are complex numbers. In some embodiments, the radar system is a digital beam forming radar. In some embodiments, the radar system further includes outputting, by the radar system, the signals received by the radar system to a display.

In another aspect, the invention includes a computer program product comprising instructions which, when the program is executed cause the computer to determine a first set of digital beamforming weights based on a desired direction of one or more analog beams of the radar system, a desired direction of one or more digital beams, and an expected direction of the multipath interference signal, determine a second set of digital beamforming weights based on the first set of digital beamforming weights to create a null in each of the one or more digital beams in the direction of the multipath interference signal, and apply the second set of digital beamforming weights during a receive duration of the radar system such that signals received by the radar system are void of the multipath interference signal.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

In general, the invention involves reducing multipath interference in radar systems and/or improving accuracy of radar system detections. Radar systems can emit and receive electromagnetic energy. Typically, a radar system spends a portion of its operation emitting (e.g., transmitting) electromagnetic energy (e.g., signals), and a portion of its operation receiving (e.g., listening to) electromagnetic signals. Emitted electromagnetic energy can impinge upon one or more objects and at least a portion of the emitted electromagnetic energy can reflect back to the radar system. In some scenarios, at least a portion of the reflected electromagnetic energy can be multipath interference (e.g., reflections that occur from objects within the radar systems' field of view that are not objects of interest for tracking, for example, buildings and/or ground).

During a receive duration, the radar system can place a null in the direction (or approximate direction) of the multipath interference, such that the multipath interference can be eliminated and/or substantially eliminated. By determining a likely direction that the multipath interference arrives to the radar system, the multipath interference can be nulled such that the effect of the multipath interference on the radar system's detection can be reduced.

Figure 1:
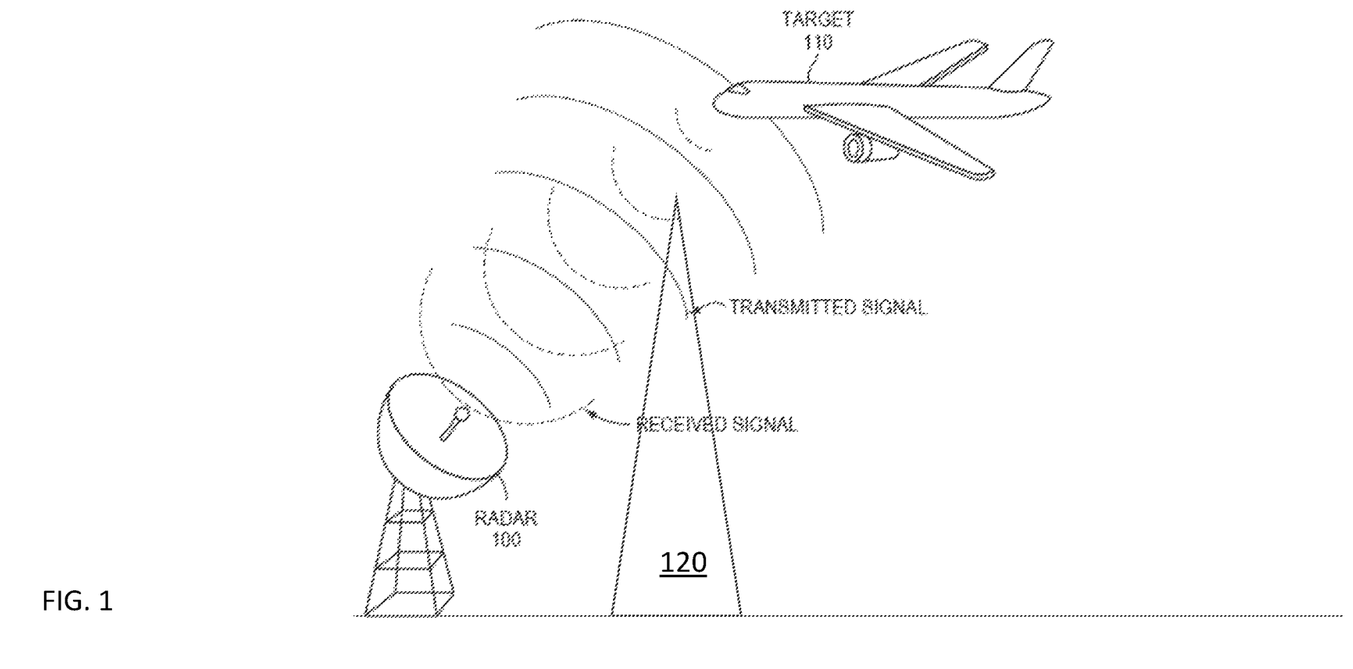
FIG. 1 is an example of a radar system and object, according to some embodiments of the invention.

FIG. 1 is an example of a radar system 100 and an object 110, according to some embodiments of the invention. The radar system 100 can emit electromagnetic energy (e.g., the transmitted signal). When the transmitted signal impinges upon the objects 110 and 120, at least a portion of the transmitted signal reflects off of the object 110 and object 120 (e.g., a mountain) and is received by the radar system 100, such that the radar system 100 can detect a false object in the direction of object 120.

The radar system 100 can include one or more array(s), as are known in the art to perform analog and/or digital beam forming. For analog beam steering, the radar system 100 can have emitters/receivers that include phase shifters, for example for steering an analog beam. The radar system's arrays can be grouped into subarrays, and each element can be referenced by its location on in a particular subarray. The element location can be referred to as x(m,n) and y(m,n), the element location of element m in subarray n. For example, for subarray 3, element 2, can have a location of (2,3).

The radar system 100 can be pointed at a target location by analog beam steering. The analog beam steering can cause the radar system to point at the target location (e.g., direction of an analog beam of the radar system) and one or more reflection signals can be received. The reflection signal(s) can include a portion that is reflected from the target along a first path (e.g., a direct receive path), and a portion that is due to multipath interference along a second path (e.g., an indirect receive path). The location of the target can be defined in a range, azimuth and elevation coordinate system, or in a uv coordinate system, as is known in the art. For example, the location of the target can also be converted from a uv coordinate system to a range, azimuth and elevation into a sine space representation, as is known in the art.

In some embodiments, a location of the target can be defined as range (R), azimuth ($\theta_{az}$) and elevation ($\theta_{el}$) coordinate system. The target in the (R, $\theta_{az}$, $\theta_{el}$) coordinate system can be converted into a sine space ($u_{rx}, v_{rx}$).

In some embodiments, the multipath interference location can be defined as range ($R_{mp}$), azimuth ($\theta_{az\_mp}$) and elevation ($\theta_{el\_mp}$) coordinate system. The multipath interference location in the (R, $\theta_{az\_mp}$, $\theta_{el\_mp}$) coordinate system can be converted into a sine space ($u_{mp}, v_{mp}$).

In some embodiments, the multipath interference signals are assumed to have the same range and the same azimuth as the target, and only elevation of the multipath interference signals is determined.

In some embodiments, the elevation of the multipath interference signals ($\theta_{EL}^R$) is determined as follows:

i) determine height of the target above the spherical earth ($h_2$). The height of the target above the spherical earth ($h_2$) can be determined as follows:

$$h_2 = h_1 + R_d \sin(\theta_{EL}^D) + \frac{R_d^2}{2a_e} \qquad \text{EQN. 1}$$

where $h_1$ is height of the antenna above sea level in meters, $a_e$ is 4/3 the earth's radius in meters (e.g., ~8493.3×10³ meters, for standard propagation atmosphere), $R_d$ is slant range of the target (e.g., which is producing the multipath), $\theta_{EL}^D$ is the direct path elevation angle (e.g., $\theta_{EL}^D = \theta_{EL}$).

ii) determine a ground range from the radar system to a ground reflection point ($G_1$). The ground range ($G_1$) can be determined as follows:

$$G_1 = \frac{G}{2} - p\sin\left(\frac{\xi}{3}\right) \qquad \text{EQN. 2}$$

where G is total ground range to the target, and p and $\xi$ are intermediate values that can be determined as follows:

$$p = \frac{2}{\sqrt{3}}\sqrt{a_e(h_1 + h_2) + \left(\frac{G}{2}\right)^2} \qquad \text{EQN. 3}$$

$$\xi = \sin^{-1}\left(\frac{2a_e G(h_2 - h_1)}{p^3}\right). \qquad \text{EQN. 4}$$

iii) determining an angle between the radar system, center of the earth and the ground reflection point ($\phi_1$). The angle ($\phi_1$) can be determined as follows:

$$\phi_1 = \frac{G_1}{a_e} \qquad \text{EQN. 5}$$

iv) determining a distance from the radar to the ground reflection point ($R_1$). The distance ($R_1$) can be determined as follows:

$$R_1 = \sqrt{h_1^2 + 4a_e(a_e + h_1)\sin\left(\frac{\phi_1}{2}\right)^2} \qquad \text{EQN. 6}$$

v) determining the elevation of the multipath interference signals ($\theta_{EL}^R$)

$$\theta_{w}^R = a\sin\left(\frac{2a_e h_1 + h_1^2 + R_1'}{2(a_e + h_1)R_1}\right) \qquad \text{EQN. 7}$$

The location of the multipath interference signals can be described as (R, $\theta_{AZ}^D$, $\theta_{EL}^R$). The multipath interference signals can be converted into uv sine space, ($u_{mp}, v_{mp}$).

In some embodiments, the multipath interference signals are determined as is known in the art.

Figure 2:
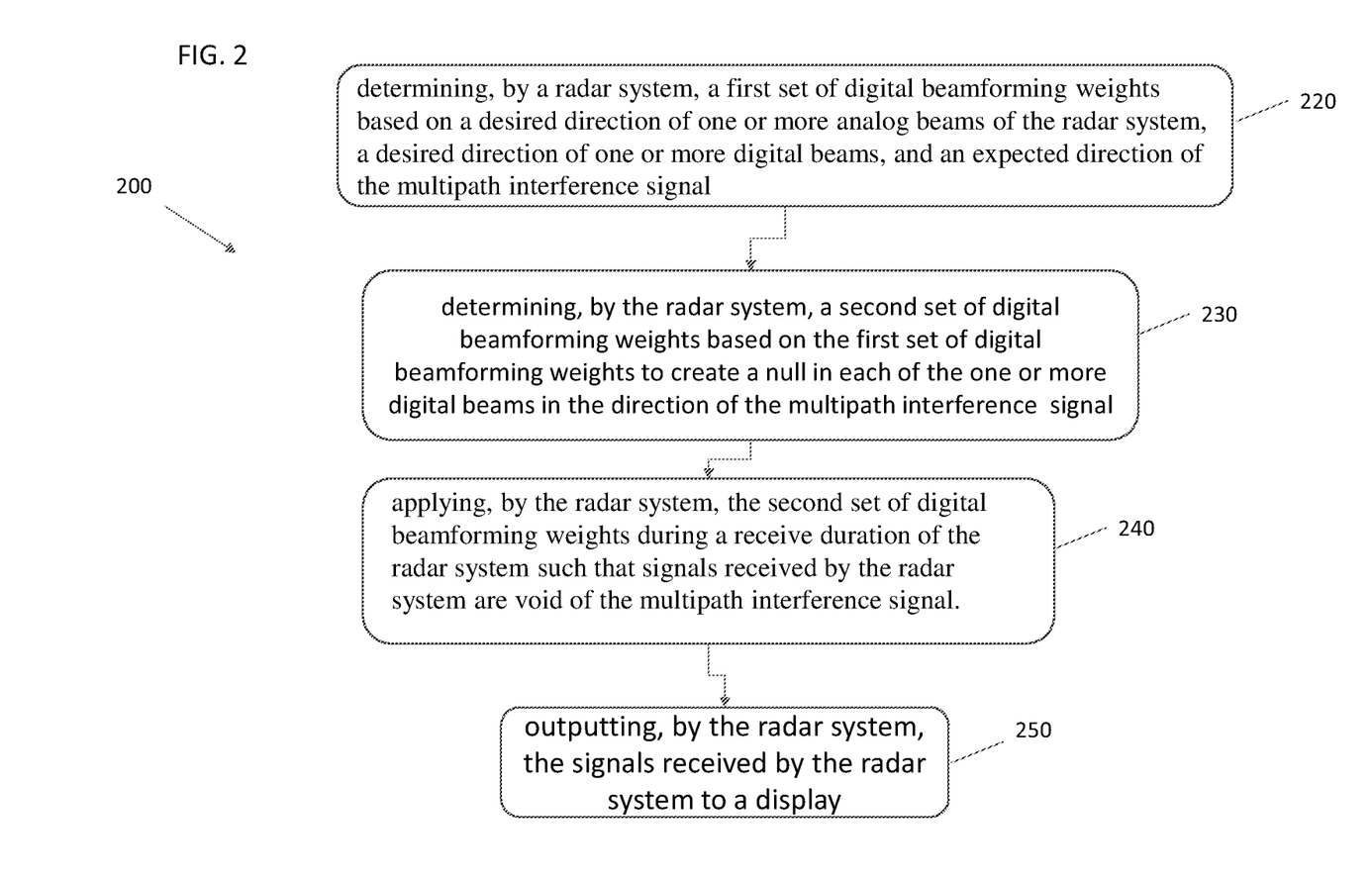
FIG. 2 is a flow chart for a method of reducing multipath interference, according to some embodiments of the invention.

FIG. 2 is a flow chart for a method of reducing multipath interference, according to illustrative embodiments of the invention.

The method can involve determining, by a radar system (e.g., radar system 100 as described above in FIG. 1), a first set of digital beamforming weights based on a desired direction of one or more analog beams of the radar system and/or a desired direction of one or more digital beams (Step 220). The desired direction of the analog beam can be based on a field of view that the radar system seeks to cover, an expected direction for a target, a user input or any combination thereof. The desired direction of the one or more digital beams can be relative to the desired direction of the one or more analog beams of the radar system.

The first set of digital beamforming weights can be determined as follows:

$$beamWeights(m, n) = W(n) * e^{-i\frac{2\pi}{\lambda}(x_{SA}(n)*\delta u(m) + y_{SA}(n)*\delta v(m))} \qquad \text{EQN. 8}$$

where W(n) is the set of digital weights to steer the analog beam of the radar system to the target, n is a particular subarray of the radar system, m is a particular element in the n subarray, $x_{SA}(n)$ and $y_{SA}(n)$ is the "phase center" of channel n, $\delta u$ (m) and $\sigma v$(m) is the receive digital beam location specified in (u,v) coordinate relative to the commanded analog beam center, and $\lambda$ is wavelength.

The method can also include determining an expected direction of the multipath interference signal relative to the desired direction of one or more analog beams of the radar system (Step 220). The expected direction of the multipath interference signal can be determined as described above in EQN. 1 through 7 above.

The method can also involve determining a second set of digital beamforming weights based on the first set of digital beamforming weights to creates a null in each of the one or more digital beams in the direction of the multipath reflected signal (Step 230).

Determining the second set of digital beamforming weights can include determining a set of beam weights to create the null in the expected direction of the multipath. For example, the beam weights in the expected null direction can be determined as follows:

$$nullWeights(n) = W(n) * e^{-i\frac{2\pi}{\lambda}(x_{SA}(n)*u_{null}+y_{SA}(n)*v_{null})} \quad \text{EQN. 9}$$

where W(n) is a set of digital weights to steer the analog beam of the radar system to the target (e.g., the digital weights that can set the direction of the analog beam of the radar system), $u_{null}$ and $v_{null}$ are sine space locations of a null beam, for example, the sine space locations as determined below in EQN. 10 and EQN. 11, respectively, $x_{SA}(n)$ and $y_{SA}(n)$ is the "phase center" of channel n, and λ is wavelength.

The sine space location of a null beam can be determined as follows:

$$u_{null} = u_{mp} - u_{rx} \quad \text{EQN. 10}$$

$$v_{null} = v_{mp} - v_{rx} \quad \text{EQN. 11}$$

where $u_{mp}$ and $v_{mp}$ are sine space locations of the multipath interference receive signal, and $u_{rx}$ and $v_{rx}$ are sine space locations of the received signals based on the analog beam steering pointed at the target location. In some embodiments, if the distance between the target location and the null location is smaller than a minimum distance (minimumNullSeperation), then the sine space location of the null beam can be modified to be separated from the target location. The minimum distance can be an input value. The minimum distance can be a minimum separation value between the null location and the target location that can ensure that nulling the multipath at least substantially avoids nulling the receive beam from the target. The distance between the target location and the null location ($d_{null}$) can be determined as follows:

$$d_{null} = \sqrt{u_{null}^2 + v_{null}^2} \quad \text{EQN. 12}$$

If $d_{null}$<minimumNullSeperation*beamwidthU, and $d_{null}$<minimumNullSeperation*beamwidthU, then $u_{null}$ is replaced with minimumNullSeperation*(beamwidthU) and $v_{null}$ is replaced with minimumNullSeperation*(beamwidthV), where beamwidthU, and beamwidthV, are beamwidth of the radar system in the u,v, dimensions adjusted by radar frequency, respectively.

In some embodiments, determining the second set of digital beamforming weights involves determining an expected complex voltage for each digital beam m ($V_{MLE}$) of the radar system in the direction that the null is to be created (e.g., direction of $u_{null}, v_{null}$, as described above) when analog beam pointing direction is $u_{rx}$, $V_{rx}$. The expected complex voltage for each digital beam m ($V_{MLE}$) can be determined as follows:

a) determining the phasing per element for the analog beam steering:

$$\Theta(k, n, u_{rx}, v_{rx}) = e^{(-i\frac{2\pi}{\lambda}(x(k,n)*u_{rx}+y(k,n)*v_{rx}))} \quad \text{EQN. 13}$$

where $\Theta(k, n, u_{rx}, V_{rx})$ is a complex multiplier for element k of channel n with the analog beam steer pointing in the location of ($u_{rx}$, $v_{rx}$).

b) applying weights to the phasing per element for the analog beam steering as follows:

$$V_{MLE}(m, u_{rx}, v_{rx}, u_{null}, v_{null}) = \quad \text{EQN. 14}$$

$$\sum_{K=1}^{N} \sum_{n=1}^{N_{SA}} \Theta(k, n, u_{rx}, v_{rx}) * W(n) * e^{-i\frac{2\pi}{\lambda}(x_{SA}(n)*\delta u(m)+y_{SA}(n)*\delta v(m))} *$$

$$e^{-i\frac{2\pi}{\lambda}(x(k,n)*u_{null}+y(k,n)*v_{null})}$$

where $N_{SA}$ is a number of subarrays of the radar system that are used in digital beam forming, N is a number of elements in the subarray of the radar system, m is the particular digital beam, $u_{rx}$, $V_{rx}$ is the sine space pointing direction towards the target, $u_{null}, v_{null}$ is the sine space pointing direction towards the null, W(n) is the set of digital weights to steer the analog beam of the radar system to the target, n is a particular subarray of the radar system, m is a particular element in the n subarray, $x_{SA}(n)$ and $y_{SA}(n)$ is the "phase center" of subarray (or channel) n, δu (m) and δv(m) is the receive digital beam location specified in (u,v) coordinate relative to the commanded analog beam center, and λ is wavelength. EQN. 14 can be rearranged to EQN. 15:

$$V_{MLE}(m, u_{rx}, v_{rx}, u_{null}, v_{null}) = \quad \text{EQN. 15}$$

$$\sum_{n=1}^{N_{SA}} W(n) * e^{-i\frac{2\pi}{\lambda}(x_{SA}(n)*\delta u(m)+y_{SA}(n)*\delta v(m))} -$$

$$\sum_{K=1}^{N} e^{-i\frac{2\pi}{\lambda}(x(k,n)*u_{null}+y(k,n)*v_{null})}$$

In some embodiments, determining the second set of digital beamforming weights also involves determining an expected complex voltage of a digital nulling beam peak in the direction of the sine space pointing direction towards the null ($u_{null}, v_{null}$) ($V_{nulling}$). The expected complex voltage of a digital nulling beam peak ($V_{nulling}$) can be determined as follows:

$$V_{nulling}(m, u_{rx}, v_{rx}, u_{null}, v_{null}) = \quad \text{EQN. 16}$$

$$\sum_{n=1}^{N_{SA}} W(n) * e^{-i\frac{2\pi}{\lambda}(x(k,n)*u_{null}+y(k,n)*v_{null})} *$$

$$\sum_{K=1}^{N} e^{-i\frac{2\pi}{\lambda}(x(k,n)*(u_{rx}-u_{null})+y(k,n)*(u_{rx}-v_{null}))}$$

In some embodiments, determining the second set of digital beamforming weights also involves applying the beam weights to create the null (nullweights(n)), the expected complex voltage for each digital beam m ($V_{MLE}$), and the expected complex voltage of a digital nulling beam peak ($V_{nulling}$), to the nominal rosette beam weights (beamWeights(m,n)), to determine the second set of digital beamforming weights, for example, as follows:

$$beamWeights_{nulled}(m, n) = beamWeights(m, n) - \left[\frac{V_{MLE}(m, u_{rx}, v_{rx}, u_{null}, v_{null})}{V_{nulling}(m, u_{rx}, v_{rx}, u_{null}, v_{null})}\right] * nullweights(n) \quad \text{EQN. 17}$$

The method can also involve applying, by the radar system, the second set of digital beamforming weights during a receive duration of the radar system such that the multipath interference signal is not received by the radar system (Step 240). Applying the second set of digital beamforming weights can cause the null in the receive antenna pattern to be formed by the radar system in the direction of (or substantially in the direction of) the expected multipath interference signal during the duration where the radar system receives. In this manner, the radar system can refrain from receiving the multipath interference signals (or substantially refrain from receiving the multipath interference signals).

The method can also involve outputting, by the radar system, the signals received by the radar system to a display (Step 250).

Figure 3:
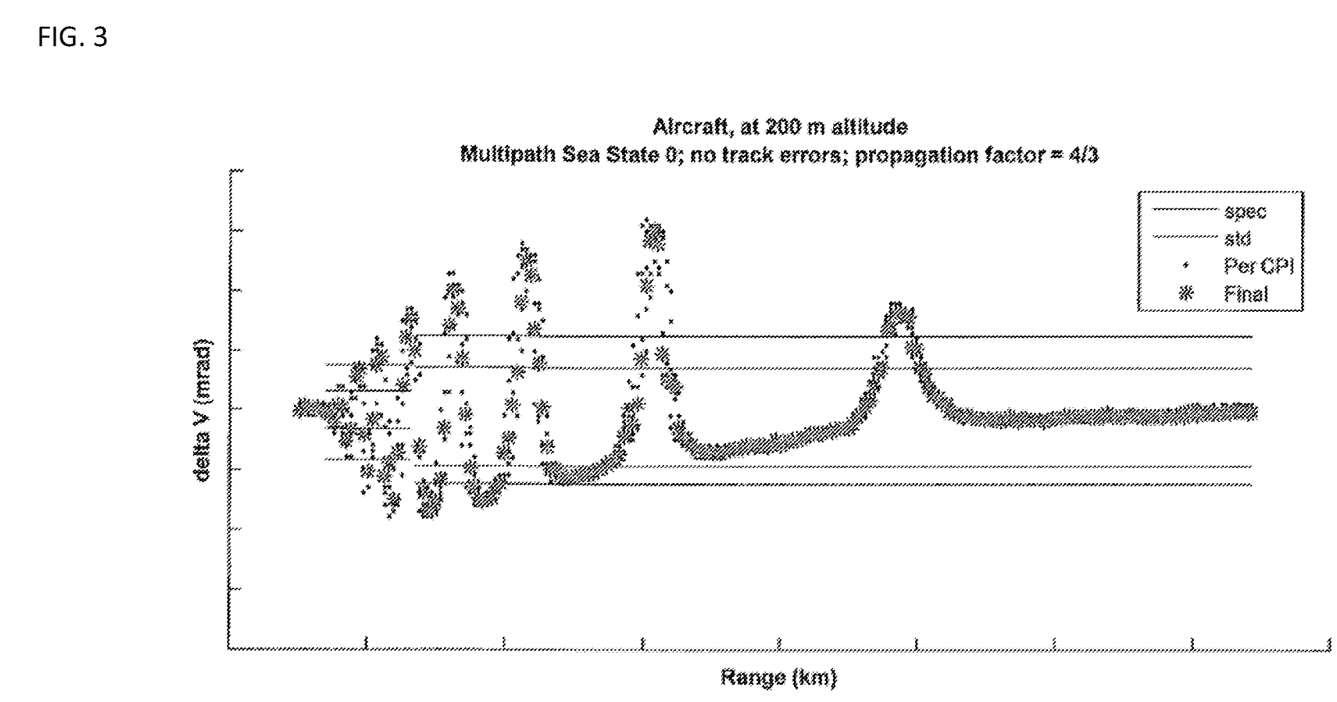
FIG. 3 is a graph showing output of a radar system without reducing multipath interference, according to the prior art.
Figure 4:
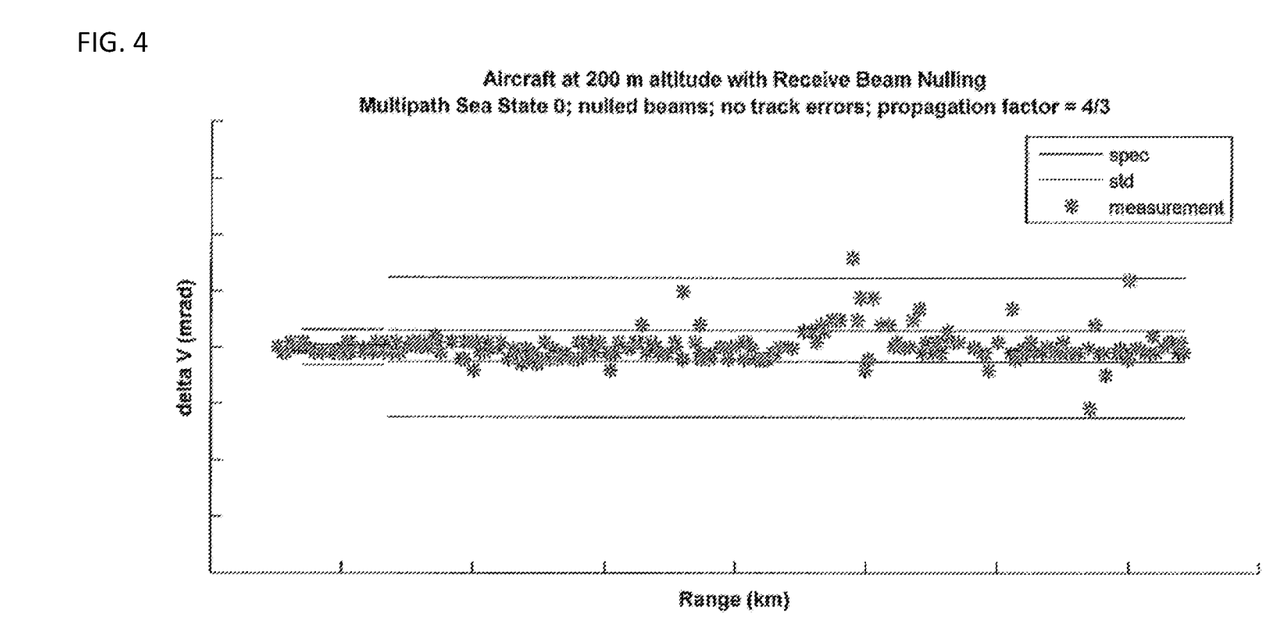
FIG. 4 is a graph showing output of the radar system of FIG. 4 with reducing multipath interference, according to some embodiments of the invention.

FIG. 3 is a graph showing output of a radar system without reducing multipath interference, according to the prior art. In FIG. 3, the radar system is tracking an aircraft at 200 meters above altitude. FIG. 4 is a graph showing output of the radar system of FIG. 3 with the reduced multipath interference, according to some embodiments of the invention. As can be seen in FIG. 4, a more stable measurement can be obtained by reducing the multipath interference as described by embodiments of the invention.

Figure 5:
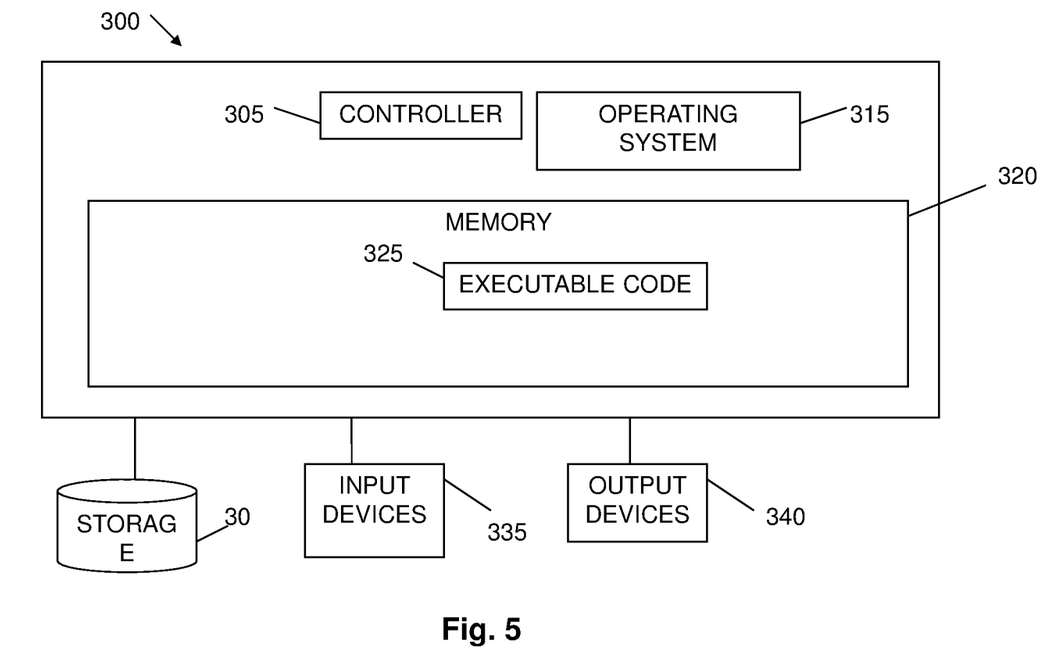
FIG. 5 is a high-level block diagram of an exemplary computing device which can be used with some embodiments of the invention.

FIG. 5 is a high-level block diagram of an exemplary computing device which can be used with embodiments of the invention. Computing device 300 can include a controller or processor 105 that can be or include, for example, one or more central processing unit processor(s) (CPU), one or more Graphics Processing Unit(s) (GPU or GPGPU), a chip or any suitable computing or computational device, an operating system 315, a memory 320, a storage 330, input devices 335 and output devices 340. Each of modules and equipment such as processors, modules, boards, integrated circuits as referred to above, and other equipment mentioned herein can be or include a computing device such as included in FIG. 2, although various units among these entities can be combined into one computing device.

Operating system 315 can be or can include any code segment designed and/or configured to perform tasks involving coordination, scheduling, arbitration, supervising, controlling or otherwise managing operation of computing device 800, for example, scheduling execution of programs. Memory 320 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 can be or can include a plurality of, possibly different memory units. Memory 320 can store for example, instructions to carry out a method (e.g. code 325), and/or data such as user responses, interruptions, etc.

Executable code 325 can be any executable code, e.g., an application, a program, a process, task or script. Executable code 325 can be executed by controller 305 possibly under control of operating system 315. For example, executable code 325 can when executed cause the antenna's to emit radiation and/or receive radiation for processing according to embodiments of the invention. In some embodiments, more than one computing device 300 or components of device 300 can be used for multiple functions described herein. For the various modules and functions described herein, one or more computing devices 300 or components of computing device 300 can be used. Devices that include components similar or different to those included in computing device 300 can be used, and can be connected to a network and used as a system. One or more processor(s) 305 can be configured to carry out embodiments of the invention by for example executing software or code. Storage 330 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 330 and can be loaded from storage 330 into a memory 320 where it can be processed by controller 305. In some embodiments, some of the components shown in FIG. 2 can be omitted.

Input devices 335 can be or can include for example a mouse, a keyboard, a touch screen or pad or any suitable input device. It will be recognized that any suitable number of input devices can be operatively connected to computing device 300 as shown by block 335. Output devices 340 can include one or more displays, speakers and/or any other suitable output devices. It will be recognized that any suitable number of output devices can be operatively connected to computing device 300 as shown by block 340. Any applicable input/output (I/O) devices can be connected to computing device 300, for example, a wired or wireless network interface card (NIC), a modem, printer or facsimile machine, a universal serial bus (USB) device or external hard drive can be included in input devices 335 and/or output devices 340.

Embodiments of the invention can include one or more article(s) (e.g. memory 320 or storage 330) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining,"

"establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for reducing multipath interference, the method comprising:
    determining, by a radar system, a first set of digital beamforming weights based on a desired direction of one or more analog beams of the radar system, a desired direction of one or more digital beams, and an expected direction of the multipath interference signal;
    determining, by the radar system, a second set of digital beamforming weights based on the first set of digital beamforming weights to create a null within each of the one or more digital beams in the direction of the multipath interference signal; and
    applying, by the radar system, the second set of digital beamforming weights during a receive duration of the radar system such that signals received by the radar system are void of the multipath interference signal.

2. The method of claim 1 wherein determining the first set of digital beamforming weights further comprises determining, by the radar system, an elevation angle of the multipath interference signals.

3. The method of claim 1 wherein determining the first set of digital beamforming weights further comprises determine a location of the multipath interference signals.

4. The method of claim 3 further comprising:
    determining, by the radar system, a location of a target based on the plurality of reflection signals;
    determining, by the radar system, a distance between the location of the multipath interference signal and the location of the target; and
    revising, by the radar system, the determined location of the multipath interference signals to a minimum distance value when the distance is less than the minimum distance.

5. The method of claim 3 wherein determining the second set of digital beamforming weights further comprises:
    determining, by the radar system, a first voltage of each digital beam of the radar system in the direction of the multipath interference signals; and
    determining, by the radar system, a second voltage of a nulling digital beam of the radar system in a direction that creates the nulls.

6. The method of claim 5 wherein the first voltage, the second voltage, or both are complex numbers.

7. The method of claim 1 wherein the radar system is a digital beam forming radar.

8. The method of claim 1 further comprising outputting, by the radar system, the signals received by the radar system to a display.

9. A radar system for reducing multipath interference comprising:
    one or more antenna arrays, each antenna array includes a plurality of antennas that can transmit and receive electromagnetic signals; and
    a processor coupled to the one or more antenna arrays, the processor configured to control the one or more antenna arrays to:
    determine a first set of digital beamforming weights based on a desired direction of one or more analog beams of the radar system, a desired direction of one or more digital beams, and an expected direction of the multipath interference signal;
    determine a second set of digital beamforming weights based on the first set of digital beamforming weights to create a null within each of the one or more digital beams in the direction of the multipath interference signal; and
    apply the second set of digital beamforming weights during a receive duration of the radar system such that signals received by the radar system are void of the multipath interference signal.

10. The radar system of claim 9 wherein determining the first set of digital beamforming weights further comprises determining, by the radar system, an elevation angle of the multipath interference signals.

11. The radar system of claim 9 wherein determining the first set of digital beamforming weights further comprises determine a location of the multipath interference signals.

12. The radar system of claim 11 wherein the process is further configured to cause the radar system to:
    determine a location of a target based on the plurality of reflection signals;
    determine a distance between the location of the multipath interference signal and the location of the target; and
    revise the determined location of the multipath interference signals to a minimum distance value when the distance is less than the minimum distance.

13. The radar system of claim 11 wherein the processor is further configured to:
    determine a first voltage of each digital beam of the radar system in the direction of the multipath interference signals; and
    determine a second voltage of a nulling digital beam of the radar system in a direction that creates the nulls.

14. The radar system of claim 13 wherein the first voltage, the second voltage, or both are complex numbers.

15. The radar system of claim 9 wherein the radar system is a digital beam forming radar.

16. The radar system of claim 9 further comprising outputting, by the radar system, the signals received by the radar system to a display.

17. A computer program product comprising instructions which, when the program is executed cause the computer to:
    determine a first set of digital beamforming weights based on a desired direction of one or more analog beams of the radar system, a desired direction of one or more digital beams, and an expected direction of the multipath interference signal;
    determine a second set of digital beamforming weights based on the first set of digital beamforming weights to create a null within each of the one or more digital beams in the direction of the multipath interference signal; and apply the second set of digital beamforming weights during a receive duration of the radar system such that signals received by the radar system are void of the multipath interference signal.

\* \* \* \* \*